(12) United States Patent
Yamashita et al.

(10) Patent No.: US 8,587,739 B2
(45) Date of Patent: Nov. 19, 2013

(54) DISPLAY DEVICE

(75) Inventors: Yuki Yamashita, Osaka (JP); Masae Kawabata, Osaka (JP); Akihiro Shoraku, Osaka (JP); Fumikazu Shimoshikiryoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 386 days.

(21) Appl. No.: 12/991,962

(22) PCT Filed: Apr. 16, 2009

(86) PCT No.: PCT/JP2009/057698
§ 371 (c)(1),
(2), (4) Date: Nov. 10, 2010

(87) PCT Pub. No.: WO2010/007824
PCT Pub. Date: Jan. 21, 2010

(65) Prior Publication Data
US 2011/0063199 A1    Mar. 17, 2011

(30) Foreign Application Priority Data
Jul. 15, 2008    (JP) .................................. 2008-183958

(51) Int. Cl.
*G02F 1/1343* (2006.01)
(52) U.S. Cl.
USPC ............................................ 349/39; 349/149
(58) Field of Classification Search
None
See application file for complete search history.

(56) References Cited

U.S. PATENT DOCUMENTS

| | | | |
|---|---|---|---|
| 5,333,004 A | 7/1994 | Mourey et al. | |
| 5,377,030 A | 12/1994 | Suzuki et al. | |
| 6,781,759 B1 | 8/2004 | Wakita et al. | |
| 7,050,038 B2 | 5/2006 | Matsuda et al. | |
| 7,499,141 B2 * | 3/2009 | Lai | 349/149 |
| 2003/0086048 A1 | 5/2003 | Ukita | |
| 2003/0227429 A1 | 12/2003 | Shimoshikiryo | |
| 2003/0234904 A1 | 12/2003 | Matsuda et al. | |

(Continued)

FOREIGN PATENT DOCUMENTS

| | | |
|---|---|---|
| CN | 1469173 A | 1/2004 |
| EP | 0 487 389 A1 | 5/1992 |

(Continued)

OTHER PUBLICATIONS

Russian Decision to Grant and English translation thereof mailed May 23, 2012 in Russian application 2010151895.

(Continued)

*Primary Examiner* — Bumsuk Won
*Assistant Examiner* — Ryan Crockett
(74) *Attorney, Agent, or Firm* — Nixon & Vanderhye P.C.

(57) ABSTRACT

A storage capacitor bus line (CsL) connected to a CS trunk line (bb) of at least one of CS trunk line groups (BB1 and BB2), which CS trunk line (bb) is other than a CS trunk line (bb) being closest to an active area (AA), has a meandering part (41) in its feed part (F) that extends from the active area (AA) to a connection point where the storage capacitor bus line (CsL) is connected to the CS trunk line (bb). The meandering part (41) is a part drawn out and deviated from a line on which the storage capacitor bus line (CsL) extends, and the meandering part (41) has a line length which is larger as a distance (d) from the active area AA to the connection point is smaller.

22 Claims, 8 Drawing Sheets

(56) References Cited

U.S. PATENT DOCUMENTS

| | | |
|---|---|---|
| 2005/0018121 A1 | 1/2005 | Jen et al. |
| 2005/0213015 A1 | 9/2005 | Shimoshikiryo |
| 2006/0256271 A1 | 11/2006 | Shimoshikiryo |
| 2007/0085963 A1 | 4/2007 | Huang et al. |
| 2008/0013029 A1 | 1/2008 | Kim |
| 2008/0097738 A1* | 4/2008 | Anderson et al. ............... 703/14 |
| 2008/0129944 A1 | 6/2008 | Park |

FOREIGN PATENT DOCUMENTS

| | | |
|---|---|---|
| JP | 6-043490 A | 2/1994 |
| JP | 7-325317 | 12/1995 |
| JP | 9-325370 A | 12/1997 |
| JP | 10-10572 | 1/1998 |
| JP | 10-339880 | 12/1998 |
| JP | 11-119193 A | 4/1999 |
| JP | 2001-188112 A | 7/2001 |
| JP | 3187736 | 7/2001 |
| JP | 2004-21069 | 1/2004 |
| JP | 2004-62146 | 2/2004 |
| JP | 2005-338595 | 12/2005 |
| JP | 2007-017829 A | 1/2007 |
| JP | 2007-72033 | 3/2007 |
| RU | 2 118 839 C1 | 9/1998 |
| SU | 1531867 A3 | 12/1989 |

OTHER PUBLICATIONS

International Search Report for PCT/JP2009/057698, mailed May 26, 2009.

* cited by examiner

DISPLAY DEVICE

This application is the U.S. national phase of International Application No. PCT/JP2009/057698 filed 16 Apr. 2009, which designated the U.S. and claims priority to JP Application No. 2008-183958 filed 15 Jul. 2008, the entire contents of each of which are hereby incorporated by reference.

TECHNICAL FIELD

The present invention relates to a display device in which storage capacitor voltages are impressed to storage capacitor bus lines via a respective plurality of CS trunk lines.

BACKGROUND ART

A liquid crystal display device employing multi-pixel drive is an example of a liquid crystal display device that deals better with a problem regarding a viewing angle dependency of a γ characteristic. According to the multi-pixel drive, each pixel is made up of two or more sub pixels of different brightness. It is thus possible to deal better with the problem regarding the viewing angle dependency of a viewing angle characteristic, i.e., the γ characteristic.

FIG. 8 shows a configuration example of a pixel of the liquid crystal display device that employs the multi-pixel drive (see, for example, Patent Literature 1).

A pixel P is divided into two sub pixels sp1 and sp2. The sub pixel sp1 includes a TFT 16a, a sub pixel electrode 18a, and a storage capacitance 22a. The sub pixel sp2 includes a TFT 16b, a sub pixel electrode 18b, and a storage capacitor 22b.

The TFTs 16a and 16b have: respective gate electrodes both connected to a common gate bus line GL; and respective source electrodes both connected to a common source bus line SL. The storage capacitance 22a is formed between the sub pixel electrode 18a and a storage capacitor bus line CsL1. The storage capacitance 22b is formed between the sub pixel electrode 18b and a storage capacitor bus line CsL2. The storage capacitor bus line CsL1 extends so as to be in parallel with the gate bus line GL across the sub pixel sp1. The storage capacitor bus line CsL2 extends so as to be in parallel with the gate bus line GL across the sub pixel sp2.

The storage capacitor bus line CsL1 of the pixel P also serves as a storage capacitor bus line CsL2 of an adjacent pixel P located next to the pixel P across the storage capacitor bus line CsL1, so that a sub pixel sp2 of the adjacent pixel P forms storage capacitance 22b with the storage capacitor bus line CsL1. On the other hand, the storage capacitor bus line CsL2 of the pixel P also serves as a storage capacitor bus line CsL1 of an adjacent pixel P located next to the pixel P across the storage capacitor bus line CsL2, so that a sub pixel sp1 of the adjacent pixel P forms storage capacitance 22a with the storage capacitor bus line CsL2.

With reference to FIGS. 9 and 10, the following description discusses a method for driving the storage capacitor bus lines CsL1 and CsL2 of a display panel of multi-pixel drive type.

As shown in FIG. 9, storage capacitor bus lines CsL (the storage capacitor bus lines CsL1 and CsL2 are collectively referred to as storage capacitor bus lines CsL), which are provided alternately in the active area AA that is the display region, are connected to the respective CS trunk lines bb provided in the region adjacent to the active area AA. The CS trunk lines bb constitute a CS trunk line group BB. The CS trunk line group BB is provided in a region adjacent to one end, i.e., given end, of the active area AA in a direction in which the storage capacitor bus lines CsL extend. Alternatively, it is possible that that CS trunk line groups BB are provided in respective regions, one of which is adjacent to one end, i.e., given end, of the active area AA in a direction in which the storage capacitor bus lines CsL extend and the other of which is adjacent to the other end of the active area AA in the direction.

In a case where a CS trunk line group BB is provided solely in the region adjacent to the one end of the active area AA, the storage capacitor bus lines CsL have one ends connected to the respective CS trunk lines bb. On the other hand, in a case where CS trunk line groups BB are provided in the respective regions adjacent to the ends of the active area AA, the storage capacitor bus lines CsL have (i) one ends connected to the respective CS trunk lines bb provided in the region adjacent to the given end of the active area AA, and (ii) the other ends connected to the respective CS trunk lines bb provided in the region adjacent to the other end of the active area AA. The CS trunk lines bb extend in a direction, i.e., a direction in which the source bus lines SL extend, which is orthogonal to the direction in which the storage capacitor bus lines CsL1 and CsL2 extend.

FIG. 9 illustrates an example in which CS trunk line groups BB, each made up of twelve CS trunk lines bb, are provided in respective regions. A storage capacitor bus line CsL is connected to one CS trunk line bb of each of the CS trunk line groups BB. The twelve (which is equal to the number n (n is an even number) of the CS trunk lines bb of each CS trunk line group BB) storage capacitor bus lines CsL, which are sequentially provided, are connected to respective different CS trunk lines bb of each CS trunk line group BB, and such connection relationships hold true for every set of twelve (i.e., the number n) storage capacitor bus lines.

In a case where a CS trunk line group BB is provided solely in the region adjacent to one end of an active area AA, n storage capacitor bus lines CsL, which are sequentially provided, are connected to respective different CS trunk lines bb of the CS trunk line group BB, and such connection relationships hold true for every set of n storage capacitor bus lines.

Both in a case where the CS trunk line group BB is provided solely in the region adjacent to the one end of the active area AA and in a case where CS trunk line groups BB are provided in the respective regions adjacent to the one and the other end of the active area AA, storage capacitor voltages Vcs as shown in FIG. 10 (in FIG. 10, Vsc1, Vcs2, and so on) are applied to the respective n storage capacitor bus lines CsL sequentially provided. Those of the storage capacitor voltages Vcs (in FIG. 10, Vcs1, Vcs2, and so on) which are supplied to respective sub pixels sp1 and sp2 of each pixel P on an odd line via storage capacitor bus lines CsL1 and CsL2 have respective binary-level waveforms that change at same timings and same cycle periods but in different ranges. The storage capacitor voltages Vcs include n/2 pairs of storage capacitor voltages Vcs, which n/2 pairs of storage capacitor voltages Vcs are supplied to respective odd lines of pixels P. The n/2 pairs of the storage capacitor voltages Vcs to be supplied to the respective odd lines of pixels P are set so as to be gradually shifted in phase from one another. In each of the odd lines of pixels P, a gate pulse Vg (in FIG. 10, Vg1, Vg3, and so on) has a pulse period during a given period of corresponding one of the n/2 pairs of storage capacitor voltages Vcs. The pulse period ends at timing when the corresponding one of the n/2 pairs of storage capacitor voltages Vcs rises or falls.

By this, data signals are written down into the odd lines of the pixels P first. After the data signals are written down, storage capacitor voltages Vcs are changed so that different amounts ΔV of electric potentials are (i) fed through to sub pixels sp1 and sp2 of a pixel P which receive an identical data signal, and (ii) added to respective electric potentials of pixel electrodes of the sub pixels sp1 and sp2. This varies luminance of the sub pixels sp1 and sp2 from each other. Average luminance of actual values of voltages which are supplied to liquid crystals during one frame period under influences of storage capacitor voltages Vcs causes the γ characteristic of the entire pixels P to be appropriate in a wide range of viewing angle.

After the odd lines of the pixels P are scanned, then even lines of the pixels P are scanned. However, unlike in the case with scanning of the odd lines of the pixels P, a pair of storage capacitor voltages to be supplied to respective sub pixels sp1 and sp2 of a same pixel P are not arranged to change in level at same timing. Nevertheless, first electric potential changes of pixel electrodes to occur after an end of a gate pulse period are same as those obtained in the case with the scanning of the odd lines of the pixels P. It is therefore possible it is still possible to enhance the γ characteristic.

The main technical feature of the present invention is to enhance the γ characteristic of the entire pixels P by employing changes of the respective different storage capacitor voltages Vcs in varying luminance of the sub-pixels sp1 and sp2 of the pixels P.

The storage capacitor voltages Vcs are supplied via corresponding CS trunk lines bb. Thus, it is arranged so that different storage capacitor voltages Vcs are supplied via the respective CS trunk lines bb of the CS trunk line group. In order that this is achieved, a CS driver (which is not illustrated) supplies, to the respective CS trunk line group, the storage capacitor voltages whose phases have equal umber to the number of the CS trunk lines bb. FIG. 10 illustrates an example in which a CS driver supplies storage capacitor voltages having 12 phases. In a case where the CS trunk line groups are provided to both ends of the active area AA, as shown in FIG. 10, the identical storage capacitor voltages Vcs are supplied via two CS trunk lines bb of the respective CS trunk line groups, which two CS trunk lines bb are connected to a same storage capacitor bus line CsL. By supplying the storage capacitor voltages from the both ends of the active area AA in this way, it is possible to prevent it that in a large-sized liquid crystal screen, interconnect delay causes a waveform of the storage capacitor voltage Vcs to vary from one point to another in the active area AA.

CITATION LIST

Patent Literature 1
Japanese Patent Application Publication, Tokukai, No. 2004-62146 A (Publication Date: Feb. 26, 2004)
Patent Literature 2
Japanese Patent Application Publication, Tokukai, No. 2007-72033 A (Publication Date: Mar. 22, 2007)
Patent Literature 3
Japanese Patent Application Publication, Tokukai, No. 2005-338595 A (Publication Date: Dec. 8, 2005)
Patent Literature 4
Japanese Patent Application Publication, Tokukaihei, No. 10-10572 A (Publication Date: Jan. 16, 1998)
Patent Literature 5
Japanese Patent Application Publication, Tokukaihei, No. 7-325317 A (Publication Date: Dec. 12, 1995)

SUMMARY OF INVENTION

Technical Problem

However, in a liquid crystal display device that performs multi-pixel drive by using conventional CS trunk lines bb, a CS trunk line group BB includes a plurality of CS trunk lines bb, as shown in FIG. 11. This, however, varies distances d between the respective CS trunk lines bb and an active area AA. The CS trunk lines bb and storage capacitor lines CsL are made from respective different metal layers formed in different layers, in such a manner that (i) the CS trunk lines bb are made of source metal, and (ii) the storage capacitor bus lines CsL are made of gate metal, for example. Each of the storage capacitor bus lines CsL extends across a region isolated from the CS trunk line group BB by a dielectric layer provided upon the CS trunk line group BB, so as to be connected to corresponding one of the CS trunk line bb via a contact hole 150 formed in the dielectric layer.

Thus, in a case where it is assumed that each distance d from the active area to a connection point (contact hole 150) is represented by a length of a feed part, at which connection point a storage capacitor bus line CsL and a corresponding CS trunk line bb are connected to each other, a storage capacitor bus line connected to a CS trunk line bb provided farther from the active area AA has a feed part with a larger length and thereby has a larger interconnect resistance. Even though the number of the CS trunk lines is such a small number as 12, the number of the storage capacitor bus lines CsL is very large, e.g., thousands orders. Therefore, it is necessary for the storage capacitor bus lines CsL to have a very small line width, as compared to a line width of the CS trunk lines bb.

The storage capacitor voltages Vcs being supplied via the respective storage capacitor bus lines CsL are to be changed by influence of the electric potentials of the pixel electrodes. In a case where there is a difference in lengths of the feed parts, the storage capacitor voltages Vcs supplied via the respective storage capacitor bus lines CsL differ from one another in amounts by which their ripple voltages are decayed at the end of the AA. FIG. 12 shows the difference in amounts by which the ripple voltages are decayed. A waveform 101 shown in full line is a waveform of a storage capacitor voltage Vcs at a part of a storage capacitor bus line CsL which has its feed part F connected to a CS trunk line provided farther from the active area (i.e., a storage capacitor bus line CsL having a feed part F whose length indicates that a distance d from the active area to the CS trunk line bb is large), the part corresponding to an end of an end of the active area AA which is closer to the feed part F. A waveform 102 shown in dashed line is a waveform of a storage capacitor voltage Vcs at a part of a storage capacitor bus line CsL which has its feed part F connected to a CS trunk line bb provided closer to the active area AA (i.e., a storage capacitor bus line CsL having a feed part F whose length indicates that a distance d from the active area AA to the CS trunk line bb is small), the part corresponding to an end of the active area AA which is closer to the feed part F. A ripple voltage of the waveform 101 is larger than that of the waveform 102.

In a case where the ripple voltages of the storage capacitor voltages supplied via the respective storage capacitor bus lines CsL vary in sizes from one another, the ripple voltages of the storage capacitor voltages have distribution at the end of the active area AA, based on positions of the storage capacitor bus lines CsL (see FIG. 9). This results in luminance distribution of sub pixels sp1 and sp2, i.e., pixels P, located near the end of the active area AA, thereby causing a problem such as one that a horizontal streak on a screen is visible.

The present invention is made in view of the problems, and an object of the present invention is to realize a display device in which ripple voltages of storage capacitor voltages have substantially no distribution at an end of an active area.

Solution to Problem

In order to attain the object, a display device of the present invention is a display device which is of active matrix type, including: a plurality of storage capacitor bus lines; a first CS trunk line group provided in a first region adjacent to one end of an active area of a display section in a direction in which the plurality of storage capacitor bus lines extend, so as to extend in a direction orthogonal to the direction in which the plurality of storage capacitor bus lines extend, the first CS trunk line group being made up of first CS trunk lines; and a second CS trunk line group provided in a second region adjacent to the other end of the active area of the display section in the direction in which the plurality of storage capacitor bus lines extend, so as to extend in the direction orthogonal to the direction in which the plurality of storage capacitor bus lines extend, the second CS trunk line group being made up of second CS trunk lines, each of the plurality of storage capacitor bus lines having one end connected to one or more of the first CS trunk lines via a contact hole and the other end connected to one or more of the second CS trunk lines via a contact hole, the one end of the each of the plurality of storage capacitor bus lines receiving a storage capacitor voltage via the one or more of the first CS trunk lines, and the other end of the each of the plurality of storage capacitor bus lines receiving the storage capacitor voltage via the one or more of the second CS trunk lines, and one or more of the plurality of storage capacitor bus lines having a meandering part in its feed part that extends from the active area to a connection point where that storage capacitor bus line is connected to that CS trunk line corresponding thereto, the meandering part being a part which is drawn out and deviated from a line on which the one or more of the plurality of storage capacitor bus lines extends from the active area to the connection point.

With the invention, respective line lengths of the meandering parts are adjusted. It is thus possible that the plurality of storage capacitor bus lines have identical interconnect resistances or similar interconnect resistances in their feed parts, irrespective of the CS trunk lines belonging to the same CS trunk line group. Thus, storage capacitor voltages supplied via the plurality of storage capacitor bus lines have identical ripple voltages or similar ripple voltages at the ends of the active area AA, irrespective of the storage capacitor bus lines. This makes it possible to avoid an occurrence of a problem such as one that in a display device, in particular a display device having a large-size screen, whose active area receives storage capacitor voltages from both ends, luminance distribution of pixels located near the ends of the active area occurs so that a horizontal streak on a screen is visible.

This makes it possible to realize a display device in which the ripple voltages of the storage capacitor voltages are less likely to have distribution at the ends of the active area.

In order to attain the object, a display device of the present invention is a display device which is of active matrix type, including: a plurality of storage capacitor bus lines; a first CS trunk line group provided in a first region adjacent to one end of an active area of a display section in a direction in which the plurality of storage capacitor bus lines extend, so as to extend in a direction orthogonal to the direction in which the plurality of storage capacitor bus lines extend, the first CS trunk line group being made up of first CS trunk lines; and a second CS trunk line group provided in a second region adjacent to the other end of the active area of the display section in the direction in which the plurality of storage capacitor bus lines extend, so as to extend in the direction orthogonal to the direction in which the plurality of storage capacitor bus lines extend, the second CS trunk line group being made up of second CS trunk lines, each of the plurality of storage capacitor bus lines having one end connected to one of the first CS trunk lines via a contact hole and the other end connected to one of the second CS trunk lines via a contact hole, the one end of the each of the plurality of storage capacitor bus lines receiving a storage capacitor voltage via the one of the first CS trunk lines, and the other end of the each of the plurality of storage capacitor bus lines receiving the storage capacitor voltage via the one of the second CS trunk lines, and at least that of the plurality of storage capacitor bus lines, which is connected to any other CS trunk line of at least one of the first and second CS trunk line groups than a CS trunk line of the same which is provided farthest from the active area, having a meandering part in its feed part that extends from the active area to a connection point where that storage capacitor bus line is connected to the any other CS trunk line, the meandering part being a part which is drawn out and deviated from a line on which the at least that of the plurality of storage capacitor bus lines extends from the active area to the connection point, and the meandering part having a line length which is larger as a distance from the active area to the connection point is smaller.

With the invention, the respective line lengths of the meandering parts vary from feed part to feed part. It is therefore possible that the plurality of storage capacitor bus lines have identical interconnect resistances or similar interconnect resistances in their feed parts, irrespective of the CS trunk lines belonging to the same CS trunk line group. Thus, the storage capacitor voltages have identical ripple voltages or similar ripple voltages at the ends of the active area. This makes it possible to avoid an occurrence of a problem such as one that in a display device, in particular a display device having a large-size screen, whose active area receives storage capacitor voltages from both ends, luminance distribution of pixels located near the ends of the active area occurs so that a horizontal streak on a screen is visible.

This makes it possible to realize a display device in which the ripple voltages of the storage capacitor voltages are less likely to have distribution at the ends of the active area.

In order to attain the object, the display device of the present invention is configured so that the first CS trunk line group has a relationship between (i) a distance from the active area to one connection point and (ii) a line length of a corresponding meandering part, which relationship is identical with that of the second CS trunk line group.

With the invention, the meandering parts have identical line lengths, irrespective of the CS trunk line groups. It is thus possible that the feed parts of the storage capacitor bus lines have identical resistances, irrespective of the CS trunk line groups.

In order to attain the object, a display device of the present invention is a display device which is of active matrix type, including: a plurality of storage capacitor bus lines; and a CS trunk line group provided in a region adjacent to one end of an active area of a display section in a direction in which the plurality of storage capacitor bus lines extend, so as to extend in a direction orthogonal to the direction in which the plurality of storage capacitor bus lines extend, the CS trunk line group being made up of CS trunk lines, each of the plurality of storage capacitor bus lines having one end connected to one or more of the CS trunk lines via a contact hole, the one end of the each of the plurality of storage capacitor bus lines receiving a storage capacitor voltage via the one or more of the CS trunk lines, and one or more of the plurality of storage capacitor bus lines having a meandering part in its feed part that extends from the active area to a connection point where that storage capacitor bus line is connected to that CS trunk line corresponding thereto, the meandering part being a part which is drawn out and deviated from a line on which the one or more of the plurality of storage capacitor bus lines extends from the active area to the connection point.

With the invention, the respective line lengths of the meandering parts are adjusted. It is thus possible that the storage capacitor bus lines have identical interconnect resistances or similar interconnect resistances in their feed parts, irrespective of the CS trunk lines belonging to the same CS trunk line group. Thus, the ripple voltages of the storage capacitor voltages supplied via the respective storage capacitor bus lines become identical or similar to one another at the end of the active area. This makes it possible to avoid an occurrence of a problem such as one that in a display device, in particular a display device having a large-size screen, whose active area receives storage capacitor voltages from both ends, luminance distribution of pixels located near the ends of the active area occurs so that a horizontal streak on a screen is visible.

This makes it possible to realize a display device in which ripple voltages of storage capacitor voltages are less likely to have distribution at an end of an active area.

In order to attain the object, a display device of the present invention is a display device which is of active matrix type, including: a plurality of storage capacitor bus lines; and a CS trunk line group provided in a region adjacent to one end of an active area of a display section in a direction in which the plurality of storage capacitor bus lines extend, so as to extend in a direction orthogonal to the direction in which the plurality of storage capacitor bus lines extend, the CS trunk line group being made up of CS trunk lines, each of the plurality of storage capacitor bus lines having one end connected to one of the CS trunk lines via a contact hole, the one end of the each of the plurality of storage capacitor bus lines receiving a storage capacitor voltage via the one of the CS trunk lines, and at least that of the plurality of storage capacitor bus lines, which is connected to any other CS trunk line of the CS trunk line group than a CS trunk line of the same which is provided farthest from the active area, having a meandering part in its feed part that extends from the active area to a connection point where that storage capacitor bus line is connected to the any other CS trunk line, the meandering part being a part which is drawn out and deviated from a line on which the at least that of the plurality of storage capacitor bus lines extends from the active area to the connection point, and the meandering part having a line length which is larger as a distance from the active area to the connection point is smaller.

With the invention, the respective line lengths of the meandering parts vary from feed part to feed part. It is thus possible that the storage capacitor bus lines have identical interconnect resistances or similar interconnect resistances in their feed parts, irrespective of the CS trunk lines belonging to the same CS trunk line group. Thus, the ripple voltages of the storage capacitor voltages supplied via the respective storage capacitor bus lines become identical or similar to one another at the end of the active area. This makes it possible to avoid an occurrence of a problem such as one that in a display device, in particular a display device having a large-size screen, whose active area receives storage capacitor voltages from one end, luminance distribution of pixels located near the end of the active area occurs so that a horizontal streak on a screen is visible.

This makes it possible to realize a display device in which ripple voltages of storage capacitor voltages are less likely to have distribution at an end of an active area.

In order to attain the object, the display device of the present invention is configured so that a range in which each meandering part exists in a corresponding feed part falls within a region which overlaps with a corresponding CS trunk line connected to a corresponding one of the plurality of storage capacitor bus lines.

With the invention, the meandering part has an electric potential substantially same as that of the corresponding CS trunk line. Thus, capacitances formed between the meandering part and the corresponding CS trunk line becomes impotent. Thus, it is possible to prevent, in proportion to impotence of the capacitance, interconnect delay caused by the storage capacitor bus line.

In order to attain the object, the display device of the present invention is configured so that each of those of the plurality of storage capacitor bus lines, which are connected to the corresponding CS trunk line or the corresponding CS trunk lines other than a CS trunk line of one of the CS trunk line groups which is provided farthest from the active area, extends to a region which overlaps with the CS trunk line provided farthest from the active area.

With the invention, capacitances formed between any one storage capacitor bus line and CS trunk lines other than the CS trunk line connected to the storage capacitor bus line can be made identical with capacitances formed between another storage capacitor bus line and CS trunk lines other than the CS trunk line connected to the storage capacitor bus line. It is thus possible for all the storage capacitor bus lines to have identical interconnect delay, and therefore it is possible for the pixels to have improved uniform luminance.

In order to attain the object, the display device of the present invention is configured so that: each CS trunk line is made up of a first CS sub trunk line provided closer to the active area and a second CS sub trunk line provided farther from the active area; and each contact hole is made up of a first sub contact hole formed above the first CS sub trunk line and a second sub contact hole formed above the second CS sub trunk line, the first and second sub contact holes being connected to each other via a connection line.

In the invention, each CS trunk line is made up of two CS sub trunk lines, and the two CS sub trunk lines are connected to each other by the connection line. Therefore, even in a case where one of the CS sub trunk lines is disconnected, the storage capacitor voltage can be passed through via the other one of the CS sub trunk lines. It is thus possible to prevent the entire CS trunk line from being disconnected.

In order to attain the object, the display device of the present invention is configured so that each meandering part is made up of at least one of a first meandering provided in a region which overlaps with the first CS sub trunk line and a second meandering provided in a region which overlaps with the second CS sub trunk line.

The invention brings about an effect that makes it easier to adjust a line lengths of the meandering part, by (i) providing one or both of the first meandering and the second meandering and (ii) adjusting respective line lengths of the first meandering and the second meandering.

In order to attain the object, the display device of the present invention is configured so that each of the first and second meanderings is provided so as to be folded one or more times in a direction orthogonal to a direction of a line on which a corresponding storage capacitor bus line extends from the active area.

The invention brings about an effect that easily adjusts a meandering length of the meandering part by changing a meandering length and the number of meanderings of the meandering.

In order to attain the object, the display device of the present invention is configured so that in the first CS sub trunk line, the first meandering is provided closer to the active area than the first sub contact hole is, and in the second CS sub trunk line, the second meandering is provided closer to the active area than the second sub contact hole is.

With the invention, the length of the meandering part can always be adjusted in a region between a sub contact hole and the active area. Therefore, it is possible to fix a positional relationship between the region of the meandering part and the sub contact hole.

In order to attain the object, the display device of the present invention is configured so that in that feed part where both the first and second meanderings are provided, the first meandering has a tail end connected to a lead end of the second meandering, and the second meandering has a tail end connected to the second sub contact hole.

With the invention, the meandering part is connected to a closest sub contact hole in such a manner that the line length of the meandering part is equal to a sum of respective lengths of the first meandering and the second meandering. Therefore, it is possible to change the line length of the meandering part by a large degree.

In order to attain the object, the display device of the present invention is configured so that: two or more of the plurality of storage capacitor bus lines have meandering parts in their feed parts, respectively; and in a feed part of that of the two or more of the plurality of storage capacitor bus lines which is connected to any CS trunk line of the CS trunk line group or the CS trunk line groups which is provided farther from the active area, the second meandering has a shorter meandering length.

The invention brings about an effect that gradually shortens the meandering part in line length while maintaining a meandering length of the first meandering.

In order to attain the object, the display device of the present invention is configured so that in that feed part where only the first meandering is provided, the first meandering has a tail end connected to the first sub contact hole.

The invention brings about an effect that makes it easier to form a meandering short in line length, by connecting the first meandering and the sub first contact hole while providing no second meandering.

In order to attain the object, the display device of the present invention is configured so that: two or more of the plurality of storage capacitor bus lines have meandering parts in their feed parts, respectively; and in a feed part of that of the two or more of the plurality of storage capacitor bus lines which is connected to any CS trunk line of the CS trunk line group or the CS trunk line groups which is provided farther from the active area, the first meandering has a shorter meandering length.

The invention brings about an effect that gradually reduces the meandering in line length.

In order to attain the object, a display device of the present invention is a display device which is of active matrix type, including: a plurality of storage capacitor bus lines; a first CS trunk line group provided in a first region adjacent to one end of an active area of a display section in a direction in which the plurality of storage capacitor bus lines extend, so as to extend in a direction orthogonal to the direction in which the plurality of storage capacitor bus lines extend, the first CS trunk line group being made up of first CS trunk lines; and a second CS trunk line group provided in a second region adjacent to the other end of the active area of the display section in the direction in which the plurality of storage capacitor bus lines extends, so as to extend in the direction orthogonal to the direction in which the plurality of storage capacitor bus lines extend, the second. CS trunk line group being made up of second CS trunk lines, each of the plurality of storage capacitor bus lines having one end connected to one or more of the first CS trunk lines via a contact hole and the other end connected to one or more of the second CS trunk lines via a contact hole, the one end of the each of the plurality of storage capacitor bus lines receiving a storage capacitor voltage via the one or more of the first CS trunk lines, and the other end of the each of the plurality of storage capacitor bus lines receiving the storage capacitor voltage via the one or more of the second CS trunk lines, and two or more of the plurality of storage capacitor bus lines having feed parts, respectively, each of which extends from the active area to a connection point where that storage capacitor bus line is connected to that CS trunk line corresponding thereto, the feed parts having different line widths.

With the invention, respective line widths of the feed parts are adjusted. It is thus possible that the storage capacitor bus lines have identical interconnect resistances or similar interconnect resistances in their feed parts, irrespective of CS trunk lines belonging to a same CS trunk line group. Thus, ripple voltages of the storage capacitor voltages supplied via the respective storage capacitor bus lines are identical or similar to one another at the ends of the active area. This makes it possible to avoid an occurrence of a problem such as one that in a display device, in particular a display device having a large-size screen, whose active area receives storage capacitor voltages from both ends, luminance distribution of pixels located near the end of the active area occurs so that a horizontal streak on a screen is visible.

This makes it possible to realize a display device in which ripple voltages of storage capacitor voltages are less likely to have distribution at ends of an active area.

In order to attain the object, a display device of the present invention is a display device which is of active matrix type, including: a plurality of storage capacitor bus lines; a first CS trunk line group provided in a first region adjacent to one end of an active area of a display section in a direction in which the plurality of storage capacitor bus lines extend, so as to extend in a direction orthogonal to the direction in which the plurality of storage capacitor bus lines extend, the first CS trunk line group being made up of first CS trunk lines; and a second CS trunk line group provided in a second region adjacent to the other end of the active area of the display section in the direction in which the plurality of storage capacitor bus lines extend, so as to extend in the direction orthogonal to the direction in which the plurality of storage capacitor bus lines extend, the second CS trunk line group being made up of second CS trunk lines, each of the plurality of storage capacitor bus lines having one end connected to one of the first CS trunk lines and the other end connected to one of the second CS trunk lines via a contact hole, the one end of the each of the plurality of storage capacitor bus lines receiving a storage capacitor voltage via the one of the first CS trunk lines, and the other end of the each of the plurality of storage capacitor bus lines receiving the storage capacitor voltage via the one of the second CS trunk lines, and at least that of the plurality of storage capacitor bus lines, which is connected to any other CS trunk line of one or both of the first and second CS trunk line groups than a CS trunk line of the same which is provided closest to the active area, having a feed part that extends from the active area to a connection point where that storage capacitor bus line is connected to that CS trunk line corresponding thereto, the feed part having a line width which is larger as a distance from the active area to the connection point is larger.

With the invention, line widths of the respective feed parts vary from one another. It is thus possible that the storage capacitor bus lines have identical interconnect resistances or similar interconnect resistances in their feed parts, irrespective of CS trunk lines belonging to a same CS trunk line group. This makes it possible to avoid an occurrence of a problem such as one that in a display device, in particular a display device having a large-size screen, whose active area receives storage capacitor voltages from both ends, luminance distribution of pixels located near the end of the active area occurs so that a horizontal streak on a screen is visible.

This makes it possible to realize a display device in which ripple voltages of storage capacitor voltages are less likely to have distribution at the ends of the active area.

In order to attain the object, a display device of the present invention is a display device which is of active matrix type, including: a plurality of storage capacitor bus lines; and, a CS trunk line group provided in a region adjacent to one end of an active area of a display section in a direction in which the plurality of storage capacitor bus lines extend, so as to extend in a direction orthogonal to the direction in which the plurality of storage capacitor bus lines extend, the CS trunk line group being made up of CS trunk lines, each of the plurality of storage capacitor bus lines having one end connected to one or more of the CS trunk lines via a contact hole, the one end of the each of the plurality of storage capacitor bus lines receiving a storage capacitor voltage via the one or more of the CS trunk lines, and two or more of the plurality of storage capacitor bus lines having feed parts, respectively, each of which extends from the active area to a connection point where that storage capacitor bus line is connected to that CS trunk line corresponding thereto, the feed parts having different line widths.

With the invention, line lengths of the respective feed parts are adjusted. It is thus possible that the storage capacitor bus lines have identical interconnect resistances or similar interconnect resistances in their feed parts, irrespective of the CS trunk lines belonging to the same CS trunk line group. Thus, ripple voltages of the storage capacitor voltages supplied via the respective storage capacitor bus lines are identical or similar to one another at the end of the active area. This makes it possible to avoid an occurrence of a problem such as one that in a display device, in particular a display device having a large-size screen, whose active area receives storage capacitor voltages from both ends, luminance distribution of pixels located near the ends of the active area occurs so that a horizontal streak on a screen is visible.

Thus, it is possible to realize a display device in which ripple voltages of storage capacitor voltages are less likely to have distribution at ends of an active area.

In order to attain the object, a display device of the present invention is a display device which is of active matrix type, including: a plurality of storage capacitor bus lines; and a CS trunk line group provided in a region adjacent to one end of an active area of a display section in a direction in which the plurality of storage capacitor bus liens extend, so as to extend in a direction orthogonal to a direction in which the plurality of storage capacitor bus lines extend, the CS trunk line group being made up of CS trunk lines, each of the plurality of storage capacitor bus lines having one end connected to one of the CS trunk lines via a contact hole, the one end of the each of the plurality of storage capacitor bus lines receiving a storage capacitor voltage via the one of the CS trunk lines, and at least that of the plurality of storage capacitor bus lines, which is connected to any other CS trunk line of the CS trunk line group than a CS trunk line of the same which is provided closest to the active area, having a feed part that extends from the active area to a connection point where that storage capacitor bus line is connected to the any other CS trunk line, the feed part having a line width which is larger as a distance from the active area to the connection point is larger.

With the invention, line lengths of the respective feed parts are made different one another, as described above. It is thus possible that the storage capacitor bus lines have identical interconnect resistances or similar interconnect resistances in their feed parts, irrespective of the CS trunk lines belonging to the same CS trunk line group. Thus, ripple voltages of the storage capacitor voltages supplied via the respective storage capacitor bus lines are identical or similar to one another at the end of the active. This makes it possible to avoid an occurrence of a problem such as one that in a display device, in particular a display device having a large-size screen, whose active area receives storage capacitor voltages from one end, luminance distribution of pixels located near the end of the active area occurs so that a horizontal streak on a screen is visible.

Thus, it is possible to realize a display device in which ripple voltages of storage capacitor voltages are less likely to have distribution in at an end of an active area.

In order to attain the object, the display device of the present invention is configured so that each pixel is made up of a plurality of sub pixels, and storage capacitances are formed between the respective plurality of sub pixels and the respective plurality of storage capacitor bus lines.

The invention brings about an effect that in a display device which employs multi-pixel drive, luminance distribution of pixels located near the end of the active area is less likely to occur.

In order to attain the object, the display device of the present invention is configured so that a storage capacitor voltage, which is applied to the plurality of sub pixels of a corresponding pixel, has a binary-level waveform with identical level-change-timing, identical cycle period, and different-range oscillation.

The invention brings about an effect that in a display device which employs multi-pixel drive, a luminance difference in sub pixels of the pixels is accurately set.

In order to attain the object, the display device of the present invention is configured so that a storage capacitor voltage, having a different level-change-timing, is applied to each CS trunk line which is connected to corresponding one of the storage capacitor bus lines for respective different pixels.

The invention brings about an effect that in a display device which employs multi-pixel drive, luminance can vary among sub pixels of the pixels in scanning order of pixel lines.

In order to attain the object, the display device of the present invention is configured so that storage capacitance is formed between a pixel and corresponding one of the storage capacitor bus lines.

The invention brings about an effect that in a display device which does not employ multi-pixel drive, two or more of the storage capacitor bus lines have identical interconnect resistances.

In order to attain the object, the display device of the present invention is configured so that an identical storage capacitor voltage is applied to the plurality of storage capacitor bus lines.

The invention brings about an effect that applies an identical voltage to respective all of the storage capacitor bus lines by using a plurality of CS trunk lines.

In order to attain the object, the display device of the present invention is a liquid crystal display device.

The invention brings about an effect that realizes a liquid crystal display device having no luminance distribution.

In order to attain the object, the display device of the present invention is configured so that each CS trunk line is made from source metal, and each storage capacitor bus line is made from gate metal.

The invention brings about an effect that uses existing materials to constitute the CS trunk lines and the storage capacitor bus lines.

Advantageous Effects of Invention

As discussed earlier, a display device of the present invention is configured so that one or more of the plurality of storage capacitor bus lines has a meandering part in its feed part that extends from the active area to a connection point where that storage capacitor bus line is connected to that CS trunk line corresponding thereto, the meandering part being a part which is drawn out and deviated from a line on which the one or more of the plurality of storage capacitor bus lines extends from the active area to the connection point.

As discussed earlier, a display device of the present invention is configured so that at least that of the plurality of storage capacitor bus lines, which is connected to any other CS trunk line of at least one of the first and second CS trunk line groups than a CS trunk line of the same which is provided farthest from the active area, has a meandering part in its feed part that extends from the active area to a connection point where that storage capacitor bus line is connected to the any other CS trunk line, the meandering part being a part which is drawn out and deviated from a line on which the at least that of the plurality of storage capacitor bus lines extends from the active area to the connection point, and the meandering part having a line length which is larger as a distance from the active area to the connection point is smaller.

As discussed earlier, a display device of the present invention is configured so that one or more of the plurality of storage capacitor bus lines has a meandering part in its feed part that extends from the active area to a connection point where that storage capacitor bus line is connected to that CS trunk line corresponding thereto, the meandering part being a part which is drawn out and deviated from a line on which the one or more of the plurality of storage capacitor bus lines extends from the active area to the connection point.

As discussed earlier, a display device of the present invention is configured so that at least that of the plurality of storage capacitor bus lines, which is connected to any other CS trunk line of the CS trunk line group than a CS trunk line of the same which is provided farthest from the active area, has a meandering part in its feed part that extends from the active area to a connection point where that storage capacitor bus line is connected to the any other CS trunk line, the meandering part being a part which is drawn out and deviated from a line on which the at least that of the plurality of storage capacitor bus lines extends from the active area to the connection point, and the meandering part having a line length which is larger as a distance from the active area to the connection point is smaller.

As discussed earlier, a display device of the present invention is configured so that two or more of the plurality of storage capacitor bus lines have feed parts, respectively, each of which extends from the active area to a connection point where that storage capacitor bus line is connected to that CS trunk line corresponding thereto, the feed parts having different line widths.

As discussed earlier, a display device of the present invention is configured so that at least that of the plurality of storage capacitor bus lines, which is connected to any other CS trunk line of one or both of the first and second, CS trunk line groups than a CS trunk line of the same which is provided closest to the active area, has a feed part that extends from the active area to a connection point where that storage capacitor bus line is connected to that CS trunk line corresponding thereto, the feed part having a line width which is larger as a distance from the active area to the connection point is larger.

As discussed earlier, a display device of the present invention is configured so that two or more of the plurality of storage capacitor bus lines have feed parts, respectively, each of which extends from the active area to a connection point where that storage capacitor bus line is connected to that CS trunk line corresponding thereto, the feed parts having different line widths.

As discussed earlier, a display device of the present invention is configured so that at least that of the plurality of storage capacitor bus lines, which is connected to any other CS trunk line of the CS trunk line group than a CS trunk line of the same which is provided closest to the active area, has a feed part that extends from the active area to a connection point where that storage capacitor bus line is connected to the any other CS trunk line, the feed part having a line width which is larger as a distance from the active area to the connection point is larger.

All of the inventions bring about an effect that realizes a display device which less likely causes the storage capacitor voltages to have distribution in ripple voltages at the end of the active area.

DESCRIPTION OF EMBODIMENTS

One embodiment of the present invention is described below with reference to FIGS. 1 through 7.

Figure 7:
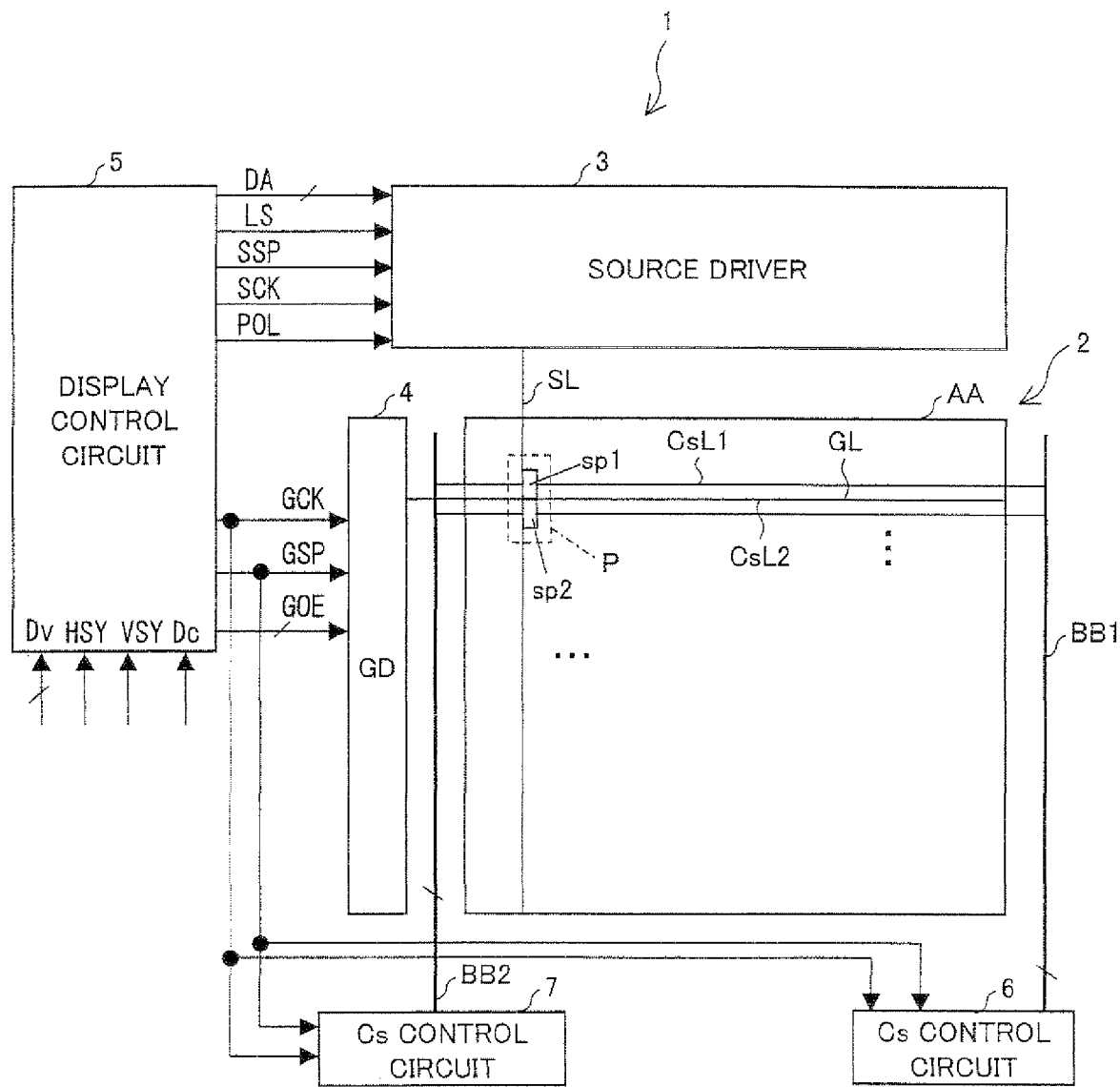
FIG. 7 is a block diagram showing a configuration of a display device.

FIG. 7 shows a configuration of a liquid crystal display device (display device) 1 of the present embodiment. As shown in FIG. 7, the liquid crystal display device 1 includes a display section 2, a source driver 3, a gate driver 4, a display control circuit 5, and Cs control circuits 6 and 7. The constituents of the liquid crystal display device 1 can be embedded into a single panel. Alternatively, it can be arranged so that some or all of the source driver 3, the gate driver 4, the display control circuit 5, and the Cs control circuits 6 and 7 are provided on an external substrate, such as a flexible print circuit board, which is connected to a panel on which the display section 2 is provided. Thus, the present embodiment is not limited to a specific layout and configuration.

Figure 8:
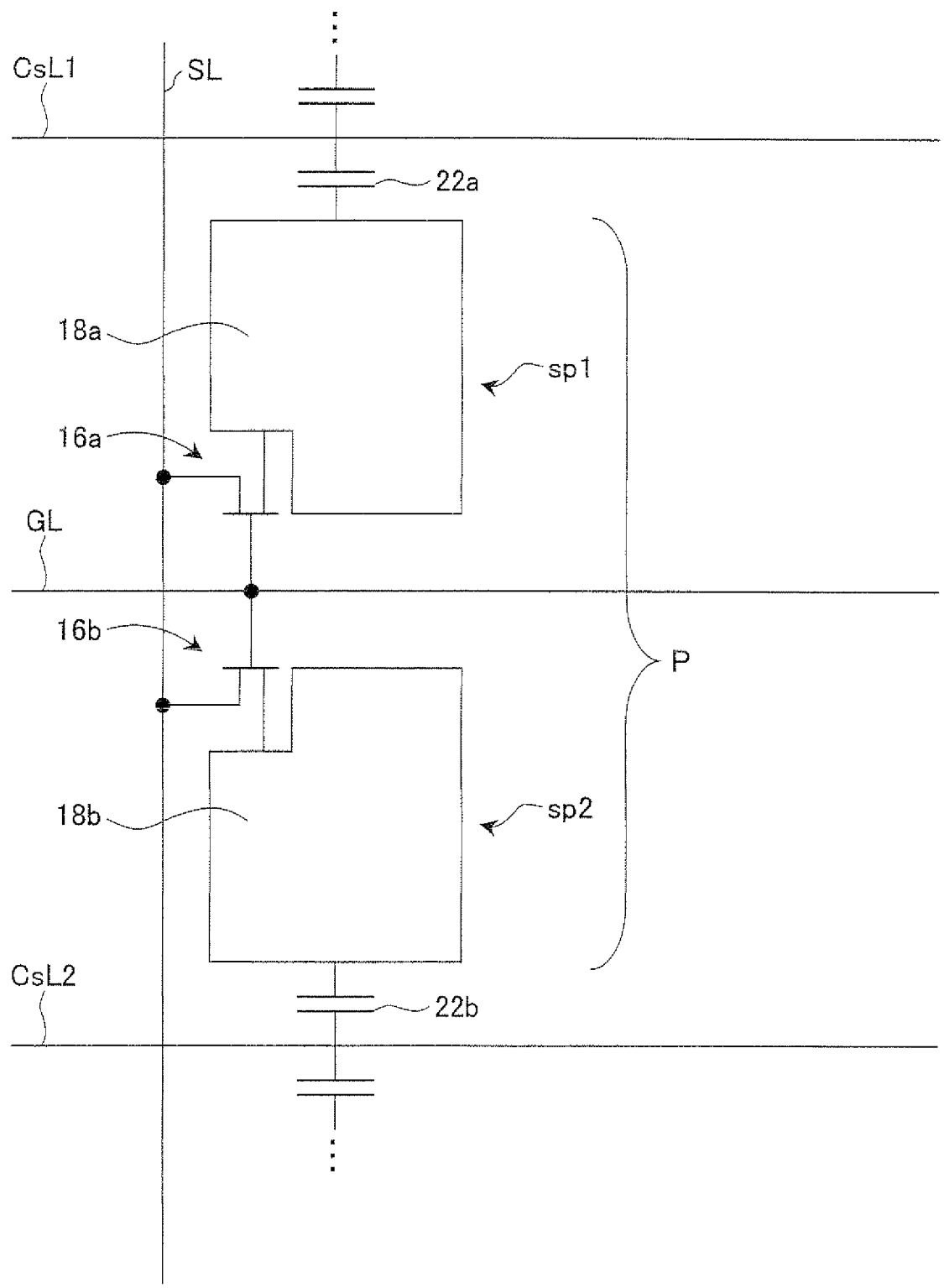
FIG. 8 is a circuit diagram showing a configuration of a pixel of multi-pixel activation type.

The display section 2 has an active matrix area AA in which pixels P as illustrated in FIG. 8 are provided in matrix, each of the pixels P having sub pixels sp1 and sp2. The display section 2 includes: a plurality of gate bus lines GL; a plurality of source bus lines SL; a plurality of storage capacitor bus lines CsL1, CsL2, ...; and two CS trunk line groups BB1 and BB2. Similarly to a configuration illustrated in FIG. 8, each of the pixels P is connected to (i) a corresponding one of the plurality of gate bus lines GL and (ii) a corresponding one of the plurality of source bus lines SL which are provided so as to intersect each other. The sub pixels sp1 and sp2 are connected to the storage capacitor bus lines CsL1 and CsL2, respectively. The CS trunk line group BB1 is provided in a region adjacent to one end of the active area AA in a direction in which the storage capacitor bus lines CsL1 and CsL2 (which are collectively referred to as storage capacitor bus lines CsL) extend. The CS trunk line group BB2 is provided in a region adjacent to the other end of the active area AA in the direction in which the storage capacitor bus lines CsL extend. The storage capacitor bus lines CsL are connected to both the CS trunk line groups BB1 and BB2.

The display control circuit 5 controls the source driver 3, the gate driver 4, and the Cs control circuits 6 and 7. The display control circuit 5 receives from an external signal source (e.g., a tuner): a digital video signal Dv indicative of an image to be displayed; a horizontal synchronization signal HSY and a vertical synchronization signal VSY both of which correspond to the digital video signal Dv; and a control signal Dc based on which to control a display operation. The display control circuit 5 generates, in response to the signals thus received, the following signals (i) through (vii) which cause the display section 2 to display the image indicated by the digital video signal Dv. Namely, (i) a data start pulse signal SSP, (ii) a data clock signal SCK, (iii) a latch strobe signal LS, (iv) a digital image signal DA (which corresponds to the video signal Dv) indicative of the image to be displayed, (v) a gate start pulse signal GSP, (vi) a gate clock signal GCK, and (vii) a gate driver output control signal (scanning signal output control signal) GOE. Then, the display control circuit 5 outputs the signals (i) through (vii).

This is described below in more detail. After the video signal Dv is subjected to timing adjustment or the like in an internal memory as appropriate, the display control circuit 5 outputs the video signal Dv as the digital video signal DA. Then, the display control circuit 5 generates the data clock signal SCK as a signal which is constituted by pulses corresponding to respective pixels for the image indicated by the digital image signal DA. The display control circuit 5 generates, in response to the horizontal synchronization signal HSY, the data start pulse signal SSP which becomes a high level (H level) during a predetermined period for every horizontal scanning period. The display control circuit 5 generates, in response to the vertical synchronization signal VSY, the gate start pulse signal GSP which becomes an H level during a predetermined period for every frame period (for every vertical scanning period). The display control circuit 5 generates the gate clock signal GCK, in response to the horizontal synchronization signal HSY, and generates the latch strobe signal LS and the gate driver output control signal GOE, in response to the horizontal synchronization signal HSY and the control signal Dc.

The display control circuit 5 supplies to the source driver 3 the digital image signal DA, the latch strobe signal LS, a signal POL based on which to control a polarity of a signal electric potential (data signal electric potential), the data start pulse signal SSP, and the data clock signal SCK, out of the signals (i) through (vii) thus generated. The display control circuit 5 supplies to the gate driver 4 the gate start pulse signal GSP, the gate clock signal GCK, and the gate driver output control signal GOE, out of the signals (i) through (vii) thus generated.

The source driver 3 sequentially generates data signals for every horizontal scanning period, in response to the digital signal DA, the data clock signal SCK, the latch strobe signal LS, the data start pulse signal SSP, and the polarity reversing signal POL thus received, which data signals are analogue electric potentials corresponding to respective pixel values of a corresponding one of scanning signal lines of the image indicated by the digital image signal DA. Then, the source driver 3 supplies the data signals to the respective plurality of source bus lines SL.

On the other hand, the gate driver 4 generates scanning signals in response to the gate start pulse signal GSP, the gate clock signal GCK, and the gate driver output control signal GOE thus received. Then, the gate driver 4 supplies the scanning signals to the plurality of gate bus lines GL so as to selectively drive the plurality of gate bus lines GL.

The source driver 3 and the gate bus driver 4 thus drive the plurality of source bus lines SL and the plurality of gate bus lines GL of the display section 2. This causes the signal electric potentials to be written from the plurality of source bus lines SL into the sub pixel electrodes via respective TFTs connected to a selected one of the plurality of gate bus lines GL. It follows that voltages, which vary depending on the digital image signal DA, are applied across the liquid crystal layer for the sub pixels in each of the pixels. This causes an amount of light, emitted from a backlight, which transmits the liquid crystal layer, to be controlled, so that the image indicated by the digital vide signal Dv is displayed on the pixels.

Each of the Cs control circuits 6 and 7 is provided for controlling electric potentials of the storage capacitor bus lines CsL, in response to the gate start pulse signal GSP and the gate clock signal GCK received from the display control circuit 5. This causes a phase, a cycle period, and the like of each storage capacitor voltage Vcs to be controlled. The Cs control circuit 6 supplies the storage capacitor voltages Vcs to the CS trunk line group BB1, and the Cs control circuit 7 supplies the storage capacitor voltages Vcs to the CS trunk line group BB2.

Figure 1:
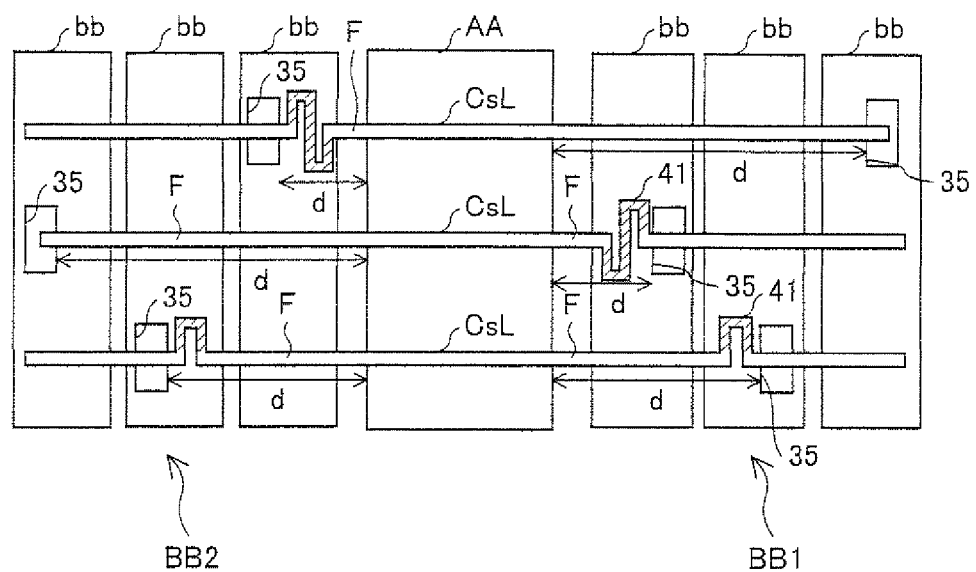
FIG. 1 is a plan view showing how storage capacitor bus lines and CS trunk lines are configured, in accordance with an embodiment of the present invention.
Figure 2:
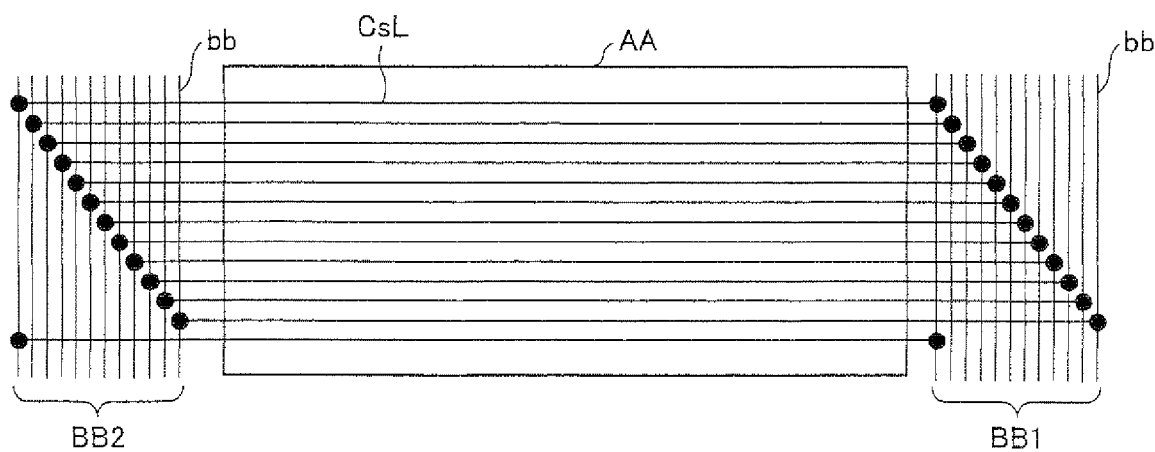
FIG. 2 is a plan view showing where the storage capacitor bus line and the CS trunk line are placed.

FIGS. 1 and 2 show how the storage capacitor bus lines CsL and the CS trunk lines bb are configured.

Figure 9:
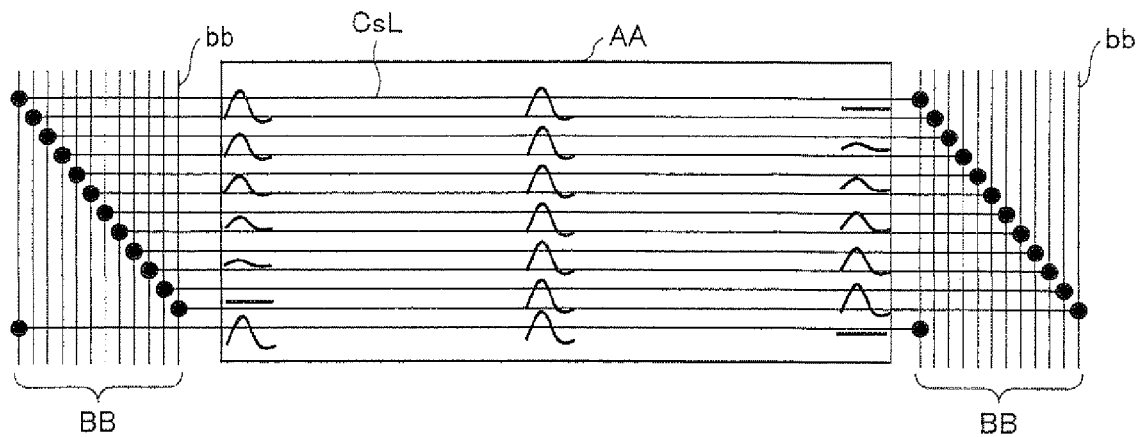
FIG. 9 is a plan view showing where a storage capacitor bus line and a CS trunk line are placed, in accordance with a conventional technique.
Figure 10:
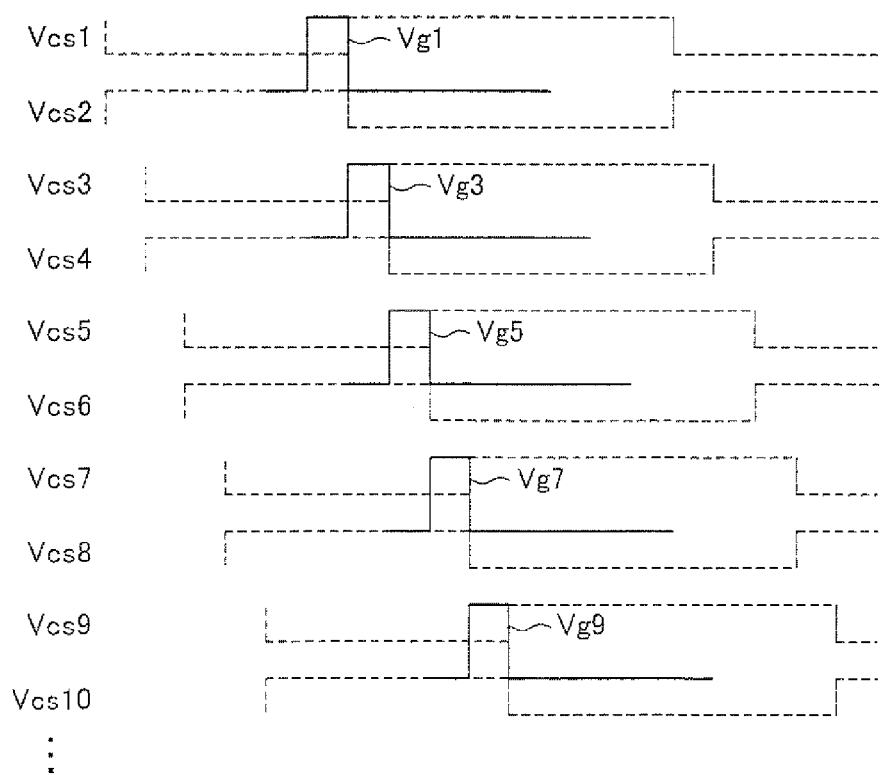
FIG. 10 is a waveform chart showing waveform examples of storage capacitor voltages supplied to the pixel shown in FIG. 8.
Figure 11:
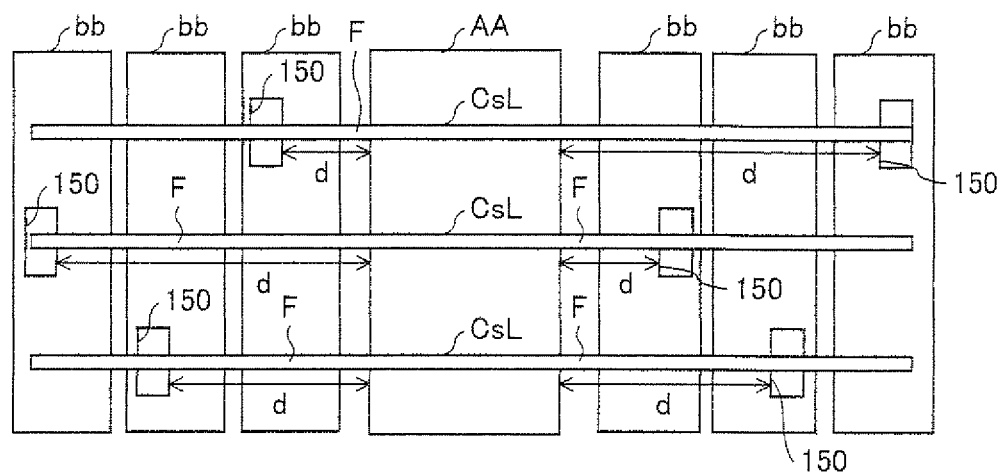
FIG. 11 is a plan view showing how storage capacitor bus lines and CS trunk lines are configured.
Figure 12:
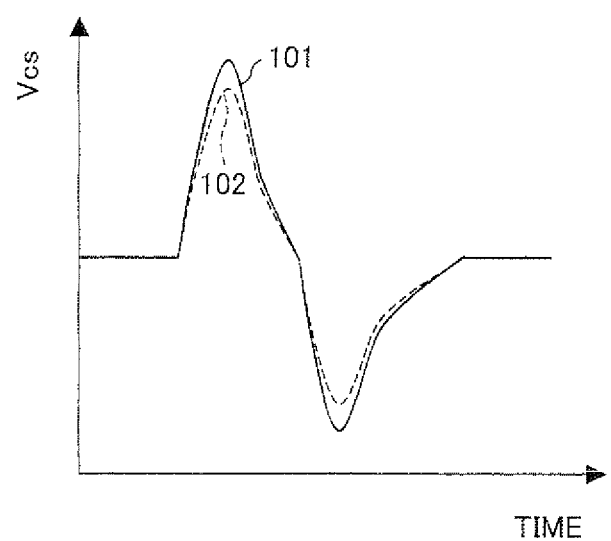
FIG. 12 is a waveform chart showing a waveform of a ripple voltage of a storage capacitor voltage obtained in case with FIG. 9.

The CS trunk lines bb are configured as discussed earlier with reference to FIGS. 9 and 11. The CS trunk line groups BB1 and BB2 shown in FIG. 2 correspond to the respective CS trunk line groups BB shown in FIG. 9. Contact holes 35 shown in FIG. 1 correspond to the contact holes 150 shown in FIG. 11. It is possible to provide only one of the CS trunk line groups BB1 and BB2. However, in a case where both the CS trunk line groups BB1 and BB2 are provided, the storage capacitor voltages Vcs are supplied to the active area AA from both ends of the active area AA. As such, it is possible to prevent interconnect delay from varying from place to place, which interconnect delay is caused by resistance and capacitance of the storage capacitor bus line CsL through which a large charging and discharging currents flow. The Cs control circuits 6 and 7 drive the CS trunk lines bb of the CS trunk line groups BB1 and BB2 in a manner similar to that discussed earlier with reference to FIG. 10.

According to the present embodiment, as shown in FIG. 1, at least that of storage capacitor bus lines CsL, which is connected to any other CS trunk line bb of a CS trunk line group BB other than a CS trunk line of the same which is provided farthest from the active area AA, has a meandering part 41 (which is shadowed in FIG. 1) in a feed part F that extends from the active area AA to a connection point where the storage capacitor bus line CsL and the CS trunk line bb of the CS trunk line group BB are connected to each other. A length of the meandering part 41 is arranged in accordance with a distance d from the active area AA to the connection point. Note that the distance d is normally considered equal to a line length obtained in a case where the meandering part 41 extends to the connection point in a line on which the storage capacitor bus line CsL extends from the active area AA. The meandering part 41 is a part drawn out and deviated from the line on which the storage capacitor bus line CsL extends from the active area AA to the connection point. A line length D of the meandering 41 can be found by subtracting the distance d from the length of the feed part F of the storage capacitor bus line CsL. As such, if the line length D is larger than zero, then it is clear that the meandering part 41 exist. In a case where the storage capacitor bus lines CsL have a uniform and identical line width, the line length D of the meandering part 41 becomes larger as the distance d becomes smaller. Note that, for the purpose of adjusting overall interconnect capacitance at same time, it is possible that a storage capacitor bus line CsL connected to the CS trunk line bb provided farthest from the active area AA has a meandering part 41 in its feed part F. Further, for the optional purpose such as a purpose of adjusting overall line capacitance, it is also possible that the storage capacitor bus line CsL has the meandering part 41 in a region outside the connection point.

With these configurations, it is possible that the storage capacitor bus lines CsL have identical interconnect resistances or have respective similar interconnect resistances in the feed part F irrespective of the CS trunk lines bb of the same CS trunk line group BB. The meanderings part 41 which belong to the CS trunk line group BB1 do not necessarily have a line length D identical to that of the meandering parts 41 belonging to the CS trunk line group BB2. However, it is preferable that the meandering parts 41 which belong to the CS trunk line group BB1 have a line length D identical to that of the meandering parts 41 belonging to the CS trunk line group BB2. Because this allows the resistances of parts of the respective storage capacitor bus lines CsL, which parts extend from the active area AA to the respective connection points, to be identical irrespective of the CS trunk line groups BB1 and BB2.

With the configurations, it is possible that the storage capacitor voltages Vcs supplied via the respective storage capacitor bus liners CsL have, at the ends of the active area AA, ripple voltages identical or similar to one another. This makes it possible to avoid an occurrence of a problem such as one that luminance distribution of sub pixels sp1 and sp2, i.e., pixels P, which are located at the ends of the active area AA occurs so that a horizontal streak on a screen is visible.

In a case where each of the storage capacitor bus lines CsL has its meandering part 41 in a range which falls within a region overlapping with a corresponding one of the CS trunk lines bb connected to the each of the storage capacitor bus lines CsL, then the meandering part 41 has a substantially same electric potential as that of the corresponding one of the CS trunk lines bb. Thus, capacitance to be formed between the meandering part 41 and the corresponding one of the CS trunk line bb is functionless. Such functionless capacitance makes it possible to prevent interconnect delay caused by the storage capacitor bus line CsL.

Also, as shown in FIG. 1, a storage capacitor bus line CsL which is connected to a CS trunk line bb other than the CS trunk line bb which is farthest from the active area AA extends to a region that overlaps with the CS trunk line bb which is farthest from the active area AA. This allows an identical capacitance to be formed between respective storage capacitor bus lines CsL and respective CS trunk lines bb other than the CS trunk line bb connected to the storage capacitor bus line CsL. It is thus possible for all the storage capacitor bus lines CsL to have identical interconnect delay, and therefore it is possible for the pixels P to have improved uniform luminance.

Figure 3:
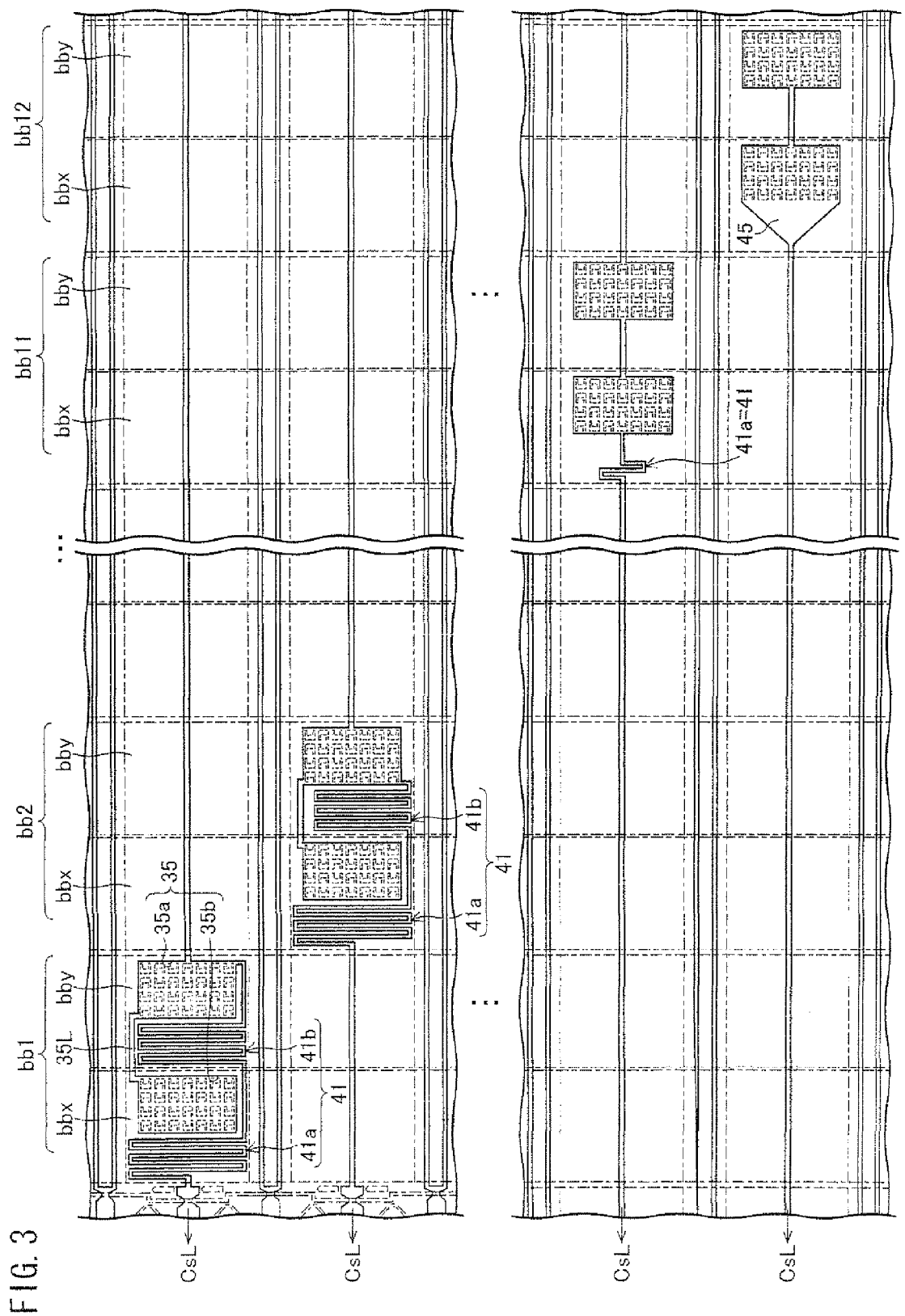
FIG. 3 is a plan view showing configuration examples of a feed part.

FIG. 3 shows a detailed example of formation of the meandering section 41.

In FIG. 3, CS trunk lines bb1 through bb12 are provided as the CS trunk lines bb, in this order from the active area AA. Each of the CS trunk lines bb is made up of two CS sub trunk lines bbx and bby which are adjacently juxtaposed. A single storage capacitor voltage is supplied to CS sub trunk lines bbx and bby of each of the CS trunk lines bb. The CS sub trunk line bbx (first CS sub trunk line) is provided closer to the active area AA, and the CS sub trunk line bby (second CS sub trunk line) is provided farther from the active area AA.

Each of contact holes 35 for the respective CS trunk lines bb is made up of: a sub contact hole 35a (second sub contact hole) for a CS sub trunk line bby; and a sub contact hole 35b (first sub contact hole) for a CS sub trunk line bbx. The CS sub trunk lines bbx and bby which form one (1) pair are connected to each other, via the sub contact holes 35a and 35b, by a connection line 35. The connection line 35L is made from a same gate metal from which the storage capacitor bus lines CsL are made.

(i) Each of the CS trunk lines bb is made up of the CS sub trunk lines bbx and bby, and (ii) the CS sub trunk lines bbx and bby are connected to each other by the connection line 35L. With the configuration, even in a case where one of the CS sub trunk lines bbx and bby is disconnected, the storage capacitor voltage Vcs can be transmitted via the other one of the CS sub trunk lines bbx and bby. This allows the entire CS trunk line bb to be prevented from being disconnected.

At least one of meanderings 41a and 41b (first meandering and second meandering), which are provided to have required meandering lengths, serves as the meandering part 41. The first meandering 41a is capable of being provided in a region which overlaps with the CS sub trunk line bbx, and the second meandering 41b is capable of being provided in a region which overlaps with the CS sub trunk line bby. The meanderings 41a and 41b are folded one or more times in a direction orthogonal to the direction in which the storage capacitor bus line CsL extend from the active area AA. According to the CS sub trunk line bbx, the meandering 41a is provided closer to the active area AA than the sub contact hole 35b is. According to the CS sub trunk line bby, the meandering 41b is provided closer to the active area AA than the sub contact hole 35a is.

In a feed part F in which both the meanderings 41a and 41b are provided (see the respective CS trunk lines bb1 and bb1 of FIG. 3), the meandering 41a has a tail end connected to a lead end of the meandering 41b, and the meandering 41b has a tail end connected to the sub contact hole 35a. In such a feed part F, a length of a meandering 41b becomes shorter as a CS trunk line bb is farther from the active area AA. In a feed part F in which only the meandering 41a is provided as the meandering 41 (see the CS trunk line bb11 of FIG. 3), the meandering 41a has a tail end connected to the sub contact hole 35b. In such a feed part F, a length of a meandering 41a becomes shorter as a CS trunk line bb is farther from the active area AA. In a feed part F in which no meandering 41 is provided (see the CS trunk line bb12 of FIG. 3 that is farthest from the active area AA), the feed part F is connected to the sub contact hole 35b via an electrode 45 which is gradually increased in width. Note that since the electrode 45 contributes to a reduction in interconnect resistance of a storage capacitor bus line CsL, the electrode can be provided as needed when the interconnect resistance is intended to be reduced.

In a case where the contact hole 35 is made up of the sub contact holes 35a and 35b, it is assumed that the distance d from the active area AA to the connection point represents a distance from the active area AA to an end of the sub contact hole 35a which is farthest from the active area AA, which end is farthest from the active area AA. In this case, the feed part F is within a range of the distance d, and a size relationship between respective found line lengths D of the meandering parts 41 matches a size relationship between respective actual line lengths D of the meandering parts 41.

Figure 4:
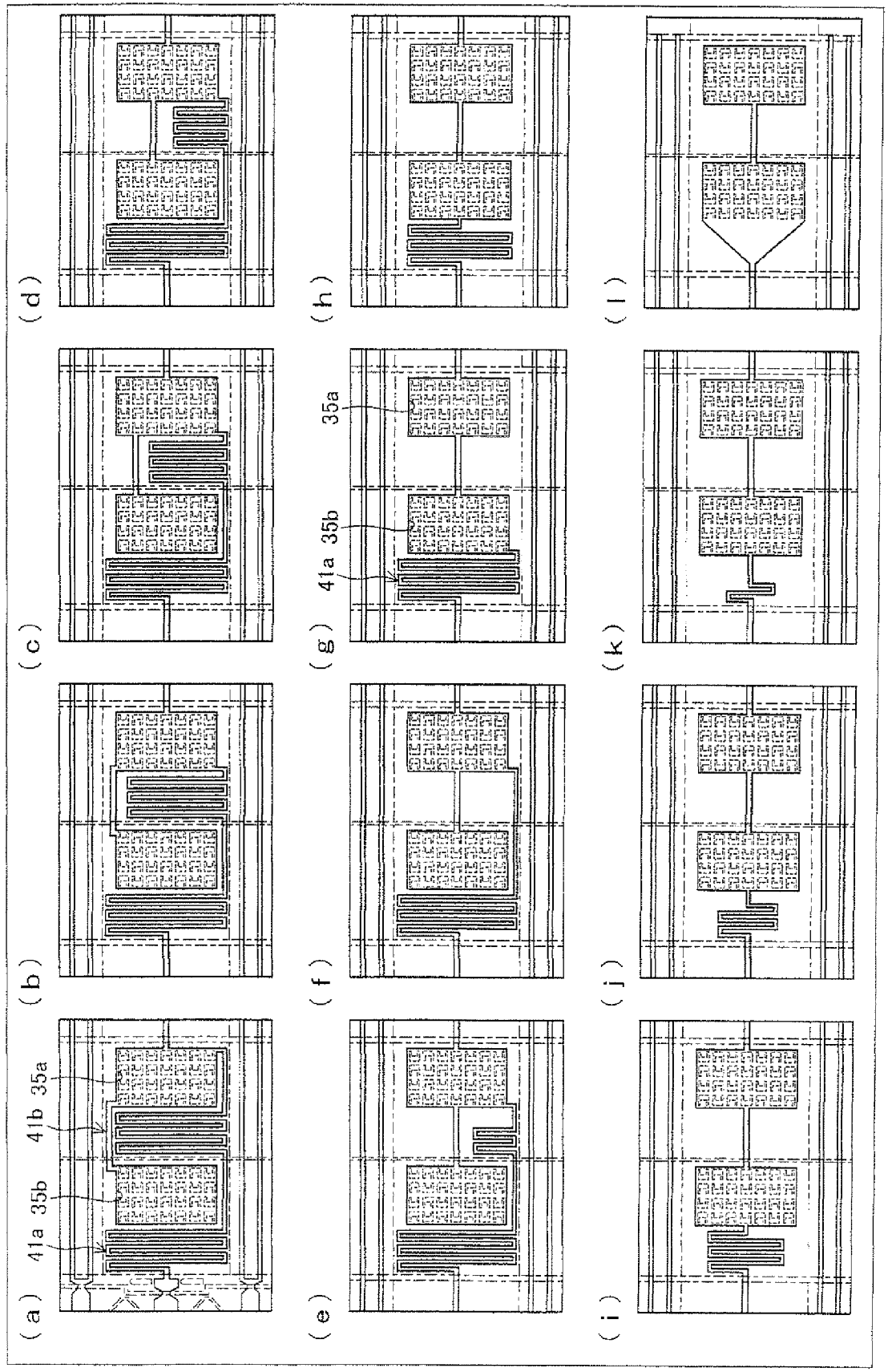
FIG. 4 (*a*) through (*l*) of FIG. 4 are plan views showing configuration examples of feed parts connected to respective different CS trunk lines.

(a) through (l) of FIG. 4 show configuration examples of meandering parts 41 for the respective CS trunk lines bb1 through bb12.

In (a) through (f) of FIG. 4, both meanderings 41a and 41b are provided. The meandering 41b is gradually reduced in meandering length in the order of (a) through (f) of FIG. 4. Note that the meandering length of each of the meanderings 41a can be adjusted by changing meandering amplitude of and/or the number of meanderings of the meandering 41b. The sub contact holes 35a and 35b are connected to each other via the connection line 35L as shown in FIG. 3, and therefore it is possible to adjust a position of the connection line 35L in accordance with the meandering length of the meandering part 41. As such, it is possible to set, with a high degree of freedom, a dimension of a region in which to provide the meandering 41 between the sub contact holes 35a and 35b.

(g) through (k) of FIG. 4 shows that a meandering 41a is merely provided. The meandering 41a is gradually reduced in meandering length in the order of (g) through (k) of FIG. 4. Note that the meandering length of each meandering part 41 can be adjusted by changing meandering amplitude of and the number of meanderings of the meandering 41a. The meandering 41a has a tail end connected to a sub contact hole 35b. A traversing region for the sub contact hole 35a, a connection line 35L, and a traversing region for a sub contact hole 35b constitute a part of a feed part F which has no meandering.

Figure 5:
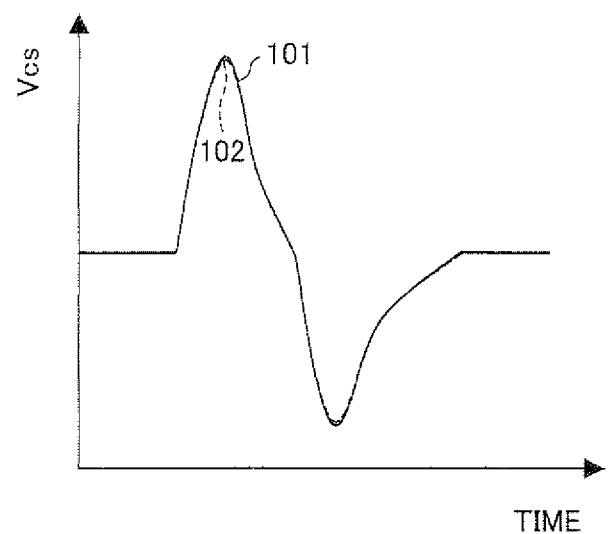
FIG. 5 is a waveform chart showing a waveform of a ripple voltage of a storage capacitor voltage.

FIG. 5 shows (i) a waveform 101 (which is shown in full line) of a storage capacitor voltage Vcs of a part of a storage capacitor bus line CsL which has its feed part F connected to a CS trunk line bb that is farther from the active area AA, the part corresponding to an end of the active area AA which is closer to the feed part F and (ii) a waveform 102 (which is shown in dashed line) of a storage capacitor voltage Vcs of a part of a storage capacitor bus line CsL which has its feed part F connected to a CS trunk line bb that is closer to the active area AA, the part corresponding to an end of the active area AA which is closer to the feed part F. As is clear from FIG. 5, the waveforms 101 and 102 are substantially identical with each other, and their ripple voltages are also identical with each other.

In the configuration examples described above, at least connected to any CS trunk lines bb other than the CS trunk line bb provided farthest from the active area AA, have the meandering parts 41 in their feed parts F, respectively. However, the present embodiment is not limited to this. Alternatively, one or more storage capacitor bus lines CsL can have a meandering part 41 in one or more feed parts F. Further, a line length of each meandering part 41 is not necessarily reduced in accordance with a corresponding distance d from the active area AA to a corresponding connection point. Instead, it is possible to adjust the resistance, for example, by optionally changing a line width of the meandering part 41. With the configuration, the line length of each meandering part 41 is adjusted. It is thus possible that the feed parts F have identical interconnect resistance or respective similar interconnect resistance irrespective of the CS trunk lines bb of the same CS trunk line group BB.

Figure 6:
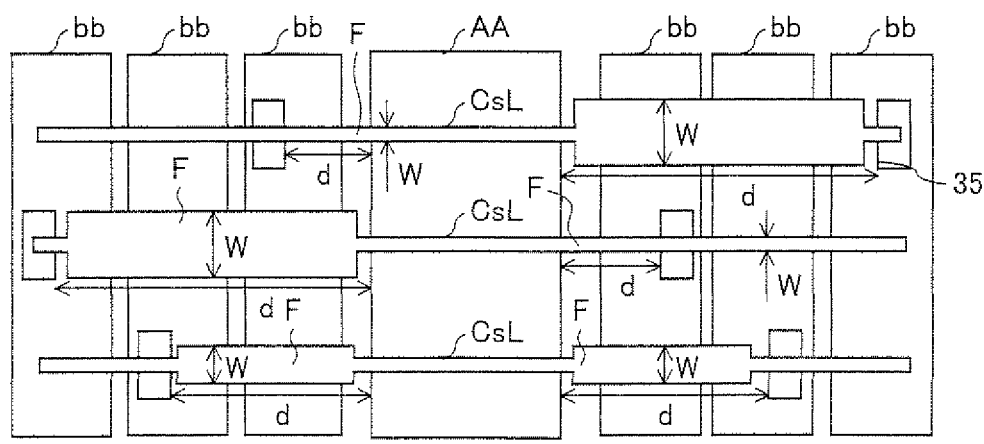
FIG. 6 is a plan view showing how storage capacitor bus lines and CS trunk lines are configured, in accordance with another embodiment of the present invention.

FIG. 6 illustrates another configuration example of the present embodiment.

According to the arrangement shown in FIG. 6, at least that of storage capacitor bus lines CsL, which is connected to any other CS trunk line bb of at least one of CS trunk line groups BB than a CS trunk line bb of the same which is closest to an active area AA, has a feed part F that (i) extends from the active area AA to a connection point contact hole 35) where the storage capacitor bus line CsL and the CS trunk line bb are connected to each other and (ii) has a length which varies in accordance with a distance d from the active area AA to the connection point (note that the distance d is normally considered equal to a line length of the feed part F obtained in a case where the feed part F extends from the active area AA to the connection point in a line on which the storage capacitor bus line CsL extends).

In this configuration example, a feed part F of a storage capacitor bus line CsL connected to a CS trunk line bb, which CS trunk line bb is farther from the active area AA, is larger in line width W, as compared to a line width of a feed part F of a storage capacitor bus line connected to a CS trunk line which is closer to the active area AA. Note that, for the purpose of adjusting overall line capacitance at same time, it is also possible that a storage capacitor bus line CsL connected to the CS trunk line bb closest to the active area AA have a feed part F that has a line length W which varies in accordance with the distance d from the active area AA to a connection point where the storage capacitor bus line CsL and the CS trunk line bb are connected to each other. Furthermore, for the purpose of, for example, adjusting overall line capacitance, it is possible that the storage capacitor bus line CsL have a larger line width W outside the connection point. Note that it is possible to provide a CS trunk line group BB solely in a region adjacent to one end of the active area AA. This is similar with the cases of the configuration examples described above.

This configuration example of the present embodiment can bring about a similar effect.

In the configuration example described above, at least those of the storage capacitor bus lines CsL, which are connected to any CS trunk lines bb other than the CS trunk line bb provided closest to the active area AA, have respective different line widths W. However, the present embodiment is not limited to this. Alternatively, it is possible that two or more of a plurality of storage capacitor bus lines CsL have feed parts F, respectively, which have different line widths W. Further, it is possible that interconnect resistance is adjusted, even in a case where a line length of the meandering part 41 does not vary in accordance with the distance d from the active area AA to the connection point. It is thus possible to consider a configuration in which a line width W is not increased in accordance with an increase in the distance d from the active area AA to the connection point. For example, it is possible to employ a combination of various types of feed parts F such as a feed part F that has a partially broad part in a length direction and a feed part F that has broad parts whose average width is middle in a length direction.

With the configuration, it is possible that respective line widths W of the feed parts F be adjusted. It is thus possible that the feed parts have identical interconnect resistances or respective similar interconnect resistance irrespective of the CS trunk lines of the same CS trunk line group BB.

Note that each pixel can have a plurality of sub pixels. Since the number of storage capacitor bus lines CsL, is simply changed in accordance with the number of sub pixels in each pixel, it is possible to directly apply the configuration of the present embodiment for making ripple voltages identical with one another.

The present embodiment is also applicable to a display device which does not employ multi-pixel drive. For example, in a configuration in which one storage capacitor line is provided for each pixel, it is possible to apply a single storage capacitor voltage to different CS trunk lines bb.

The present invention is not limited to the configuration examples of the embodiment above, but may be altered by a skilled person within the scope of the claims. An embodiment based on a proper combination of technical means altered as appropriate within the scope of the claims is encompassed in the technical scope of the present invention.

INDUSTRIAL APPLICABILITY

The present invention is suitably applicable to a display device to which a storage capacitor voltage is applied.

REFERENCE SIGNS LIST

1. Liquid crystal display device (display device)
2. Display device
22a, 22b. Storage capacitance
35a. Sub contact hole (second sub contact hole)
35b. Sub contact hole (first sub contact hole)
41. Meandering part
P. Pixel
sp1, sp2. Sub pixel
AA. Active area
CsL. Storage capacitor bus line
CsL1. Storage capacitor bus line
CsL2. Storage capacitor bus line
Vcs. Storage capacitor voltage
F. Feed part
BB1, BB2. CS trunk line group
bb. CS trunk line
bbx. CS sub trunk line (first CS sub trunk line)
bby. CS sub trunk line (second CS sub trunk line)

The invention claimed is:

1. A display device which is of active matrix type, comprising:
    a plurality of storage capacitor bus lines;
    a first CS trunk line group provided in a first region adjacent to one end of an active area of a display section in a direction in which the plurality of storage capacitor bus lines extend, so as to extend in a direction orthogonal to the direction in which the plurality of storage capacitor bus lines extend, the first CS trunk line group being made up of first CS trunk lines; and
    a second CS trunk line group provided in a second region adjacent to the other end of the active area of the display section in the direction in which the plurality of storage capacitor bus lines extend, so as to extend in the direction orthogonal to the direction in which the plurality of storage capacitor bus lines extend, the second CS trunk line group being made up of second CS trunk lines,
    a third CS trunk line group being made up of third CS trunk lines,
    each of the plurality of storage capacitor bus lines having one end connected to one or more of the first CS trunk lines via a contact hole and the other end connected to one or more of the second CS trunk lines via a contact hole, the one end of the each of the plurality of storage capacitor bus lines receiving a storage capacitor voltage via the one or more of the first CS trunk lines, and the other end of the each of the plurality of storage capacitor bus lines receiving the storage capacitor voltage via the one or more of the second CS trunk lines, and
    one or more of the plurality of storage capacitor bus lines having a meandering part in its feed part that extends from the active area to a connection point where that storage capacitor bus line is connected to that CS trunk line corresponding thereto, the meandering part being a part which is drawn out and deviated from a line on which the one or more of the plurality of storage capacitor bus lines extends from the active area to the connection point; and
    wherein a range in which each meandering part exists in a corresponding feed part falls within a region which overlaps with a corresponding CS trunk line connected to a corresponding one of the plurality of storage capacitor bus lines, wherein the meandering part overlaps only with the corresponding CS trunk line connected to the storage capacitor bus line so that the meandering part does not overlap with any CS trunk line that is not connected to the storage capacitor bus line, and wherein the meandering part which overlaps with corresponding CS trunk line is contained within a width of the corresponding CS trunk line.

2. The display device as set forth in claim 1, wherein the range in which each meandering part exists in a corresponding feed part is within a region facing, via an insulating film, the CS trunk line connected to the feed part.

3. The display device as set forth in claim 1, wherein:
    each of those of the plurality of storage capacitor bus lines, which are connected to the corresponding CS trunk line or the corresponding CS trunk lines other than a CS trunk line of one of the CS trunk line groups which is provided farthest from the active area, extends to a region which overlaps with the CS trunk line provided farthest from the active area.

4. The display device as set forth in claim 1, wherein:
    each CS trunk line is made up of a first CS sub trunk line provided closer to the active area and a second CS sub trunk line provided farther from the active area; and
    each contact hole is made up of a first sub contact hole formed above the first CS sub trunk line and a second sub contact hole formed above the second CS sub trunk line, the first and second sub contact holes being connected to each other via a connection line.

5. The display device as set forth in claim 4, wherein:
    each meandering part is made up of at least one of a first meandering provided in a region which overlaps with the first CS sub trunk line and a second meandering provided in a region which overlaps with the second CS sub trunk line.

6. The display device as set forth in claim 5, wherein:
    each of the first and second meanderings is provided so as to be folded one or more times in a direction orthogonal to a direction of a line on which a corresponding storage capacitor bus line extends from the active area.

7. The display device as set forth in claim 5, wherein:
in the first CS sub trunk line, the first meandering is provided closer to the active area than the first sub contact hole is, and in the second CS sub trunk line, the second meandering is provided closer to the active area than the second sub contact hole is.

8. The display device as set forth in claim 7, wherein:
in that feed part where both the first and second meanderings are provided, the first meandering has a tail end connected to a lead end of the second meandering, and the second meandering has a tail end connected to the second sub contact hole.

9. The display device as set forth in claim 8, wherein:
two or more of the plurality of storage capacitor bus lines have meandering parts in their feed parts, respectively; and
in a feed part of that of the two or more of the plurality of storage capacitor bus lines which is connected to any CS trunk line of the CS trunk line group or the CS trunk line groups which is provided farther from the active area, the second meandering has a shorter meandering length.

10. The display device as set forth in claim 7, wherein:
in that feed part where only the first meandering is provided, the first meandering has a tail end connected to the first sub contact hole.

11. The display device as set forth in claim 10, wherein:
two or more of the plurality of storage capacitor bus lines have meandering parts in their feed parts, respectively; and
in a feed part of that of the two or more of the plurality of storage capacitor bus lines which is connected to any CS trunk line of the CS trunk line group or the CS trunk line groups which is provided farther from the active area, the first meandering has a shorter meandering length.

12. The display device as set forth in claim 1, wherein:
each pixel is made up of a plurality of sub pixels, and storage capacitances are formed between the respective plurality of sub pixels and the respective plurality of storage capacitor bus lines.

13. The display device as set forth in claim 12, wherein:
a storage capacitor voltage, which is applied to the plurality of sub pixels of a corresponding pixel, has a binary-level waveform with identical level-change-timing, identical cycle period, and different-range oscillation.

14. The display device as set forth in claim 12, wherein:
a storage capacitor voltage, having a different level-change-timing, is applied to each CS trunk line which is connected to corresponding one of the storage capacitor bus lines for respective different pixels.

15. The display device as set forth in claim 1, wherein:
storage capacitance is formed between a pixel and corresponding one of the storage capacitor bus lines.

16. The display device as set forth in claim 15, wherein:
an identical storage capacitor voltage is applied to the plurality of storage capacitor bus lines.

17. The display device as set forth in claim 1, wherein:
the display device is a liquid crystal display device.

18. The display device as set forth in claim 1, wherein:
each CS trunk line is made from source metal, and each storage capacitor bus line is made from gate metal.

19. A display device which is of active matrix type, comprising:
a plurality of storage capacitor bus lines;
a first CS trunk line group provided in a first region adjacent to one end of an active area of a display section in a direction in which the plurality of storage capacitor bus lines extend, so as to extend in a direction orthogonal to the direction in which the plurality of storage capacitor bus lines extend, the first CS trunk line group being made up of first CS trunk lines; and
a second CS trunk line group provided in a second region adjacent to the other end of the active area of the display section in the direction in which the plurality of storage capacitor bus lines extend, so as to extend in the direction orthogonal to the direction in which the plurality of storage capacitor bus lines extend, the second CS trunk line group being made up of second CS trunk lines,
a third CS trunk line group being made up of third CS trunk lines,
each of the plurality of storage capacitor bus lines having one end connected to one of the first CS trunk lines via a contact hole and the other end connected to one of the second CS trunk lines via a contact hole, the one end of the each of the plurality of storage capacitor bus lines receiving a storage capacitor voltage via the one of the first CS trunk lines, and the other end of the each of the plurality of storage capacitor bus lines receiving the storage capacitor voltage via the one of the second CS trunk lines, and
at least that of the plurality of storage capacitor bus lines, which is connected to any other CS trunk line of at least one of the first and second CS trunk line groups than a CS trunk line of the same which is provided farthest from the active area, having a meandering part in its feed part that extends from the active area to a connection point where that storage capacitor bus line is connected to the any other CS trunk line, the meandering part being a part which is drawn out and deviated from a line on which the at least that of the plurality of storage capacitor bus lines extends from the active area to the connection point, and the meandering part having a line length which is larger as a distance from the active area to the connection point is smaller; and
wherein a range in which each meandering part exists in a corresponding feed part falls within a region which overlaps with a corresponding CS trunk line connected to a corresponding one of the plurality of storage capacitor bus lines, wherein the meandering part overlaps only with the corresponding CS trunk line connected to the storage capacitor bus line so that the meandering part does not overlap with any CS trunk line that is not connected to the storage capacitor bus line, and wherein the meandering part which overlaps with corresponding CS trunk line is contained within a width of the corresponding CS trunk line.

20. The display device as set forth in claim 19, wherein:
the first CS trunk line group has a relationship between (i) a distance from the active area to one connection point and (ii) a line length of a corresponding meandering part, which relationship is identical with that of the second CS trunk line group.

21. A display device which is of active matrix type, comprising:
a plurality of storage capacitor bus lines; and
a CS trunk line group provided in a region adjacent to one end of an active area of a display section in a direction in which the plurality of storage capacitor bus lines extend, so as to extend in a direction orthogonal to the direction in which the plurality of storage capacitor bus lines extend, the CS trunk line group being made up of CS trunk lines,
each of the plurality of storage capacitor bus lines having one end connected to one or more of the CS trunk lines via a contact hole, the one end of the each of the plurality of storage capacitor bus lines receiving a storage capacitor voltage via the one or more of the CS trunk lines, and one or more of the plurality of storage capacitor bus lines having a meandering part in its feed part that extends from the active area to a connection point where that storage capacitor bus line is connected to that CS trunk line corresponding thereto, the meandering part being a part which is drawn out and deviated from a line on which the one or more of the plurality of storage capacitor bus lines extends from the active area to the connection point; and wherein a range in which each meandering part exists in a corresponding feed part falls within a region which overlaps with a corresponding CS trunk line connected to a corresponding one of the plurality of storage capacitor bus lines, wherein the meandering part overlaps only with the corresponding CS trunk line connected to the storage capacitor bus line so that the meandering part does not overlap with any CS trunk line that is not connected to the storage capacitor bus line, and wherein the meandering part which overlaps with corresponding CS trunk line is contained within a width of the corresponding CS trunk line.

22. A display device which is of active matrix type, comprising:

a plurality of storage capacitor bus lines; and a CS trunk line group provided in a region adjacent to one end of an active area of a display section in a direction in which the plurality of storage capacitor bus lines extend, so as to extend in a direction orthogonal to the direction in which the plurality of storage capacitor bus lines extend, the CS trunk line group being made up of CS trunk lines, each of the plurality of storage capacitor bus lines having one end connected to one of the CS trunk lines via a contact hole, the one end of the each of the plurality of storage capacitor bus lines receiving a storage capacitor voltage via the one of the CS trunk lines, and at least that of the plurality of storage capacitor bus lines, which is connected to any other CS trunk line of the CS trunk line group than a CS trunk line of the same which is provided farthest from the active area, having a meandering part in its feed part that extends from the active area to a connection point where that storage capacitor bus line is connected to the any other CS trunk line, the meandering part being a part which is drawn out and deviated from a line on which the at least that of the plurality of storage capacitor bus lines extends from the active area to the connection point, and the meandering part having a line length which is larger as a distance from the active area to the connection point is smaller; and wherein a range in which each meandering part exists in a corresponding feed part falls within a region which overlaps with a corresponding CS trunk line connected to a corresponding one of the plurality of storage capacitor bus lines, wherein the meandering part overlaps only with the corresponding CS trunk line connected to the storage capacitor bus line so that the meandering part does not overlap with any CS trunk line that is not connected to the storage capacitor bus line, and wherein the meandering part which overlaps with corresponding CS trunk line is contained within a width of the corresponding CS trunk line.

* * * * *